Oct. 12, 1971  H. A. RASCHKE  3,611,515
SAFETY GATE LATCHING MECHANISM
Filed June 4, 1970  2 Sheets-Sheet 1
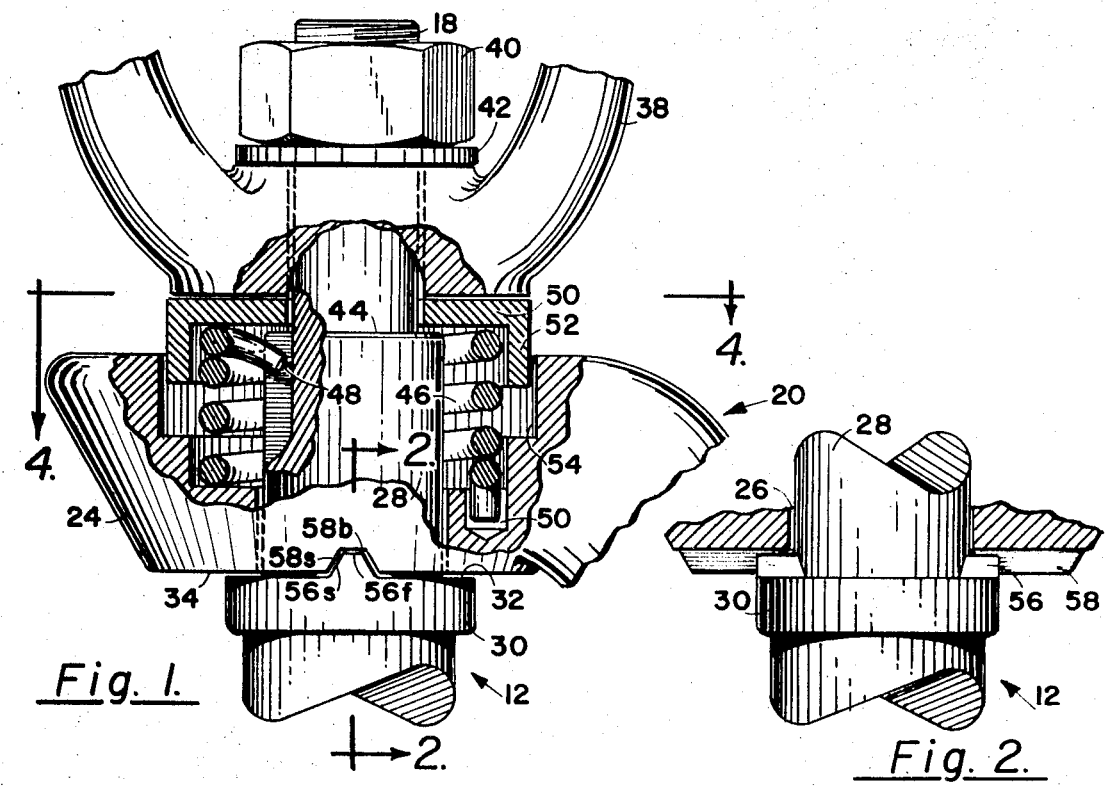
Fig. 1.
Fig. 2.
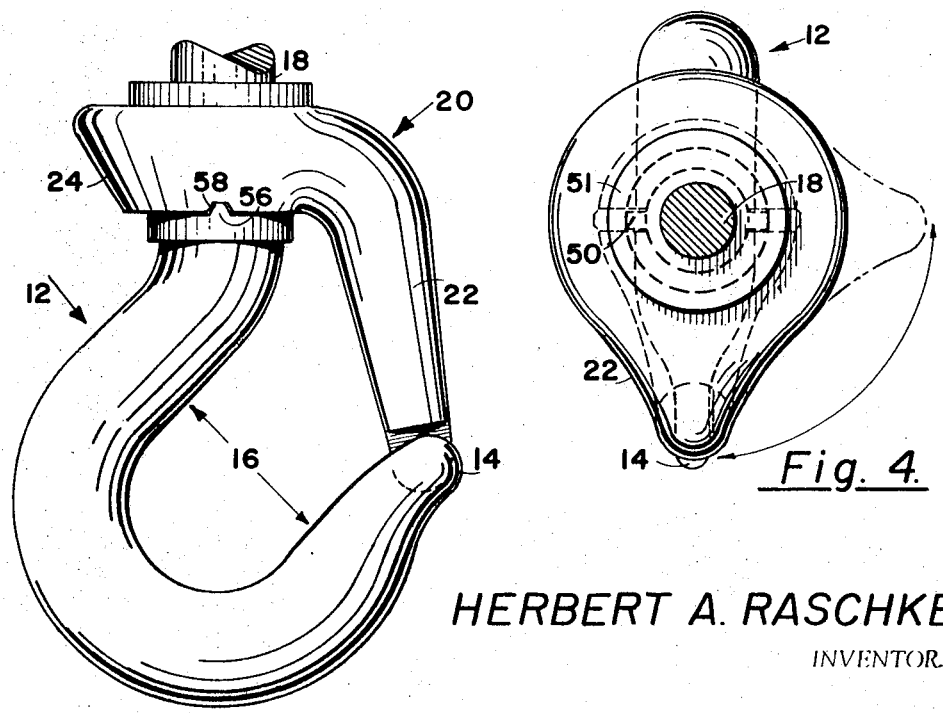
Fig. 3.
Fig. 4.
HERBERT A. RASCHKE
INVENTOR.
BY
Townsend and Townsend HERBERT A. RASCHKE
INVENTOR.
BY
Townsend and Townsend United States Patent Office 3,611,515
Patented Oct. 12, 1971

3,611,515
SAFETY GATE LATCHING MECHANISM
Herbert A. Raschke, Greenbrae, Calif., assignor to
E. D. Bullard Company, Sausalito, Calif.
Continuation-in-part of application Ser. No. 793,825,
Jan. 24, 1969. This application June 4, 1970, Ser.
No. 43,324
Int. Cl. B66c 1/34
U.S. Cl. 24—241 PL                                6 Claims

ABSTRACT OF THE DISCLOSURE

A safety gate for a hoisting hook. A spring loaded mechanism for biasing the gate toward a closed position. Complementary keystone shaped locking members that retain the gate in a closed position. An annular abutment on the shank of the hook that protects the spring against excessive shearing forces.

---

This application is a continuation-in-part of U.S. Patent application, Ser. No. 793,825, filed Jan. 24, 1969 and now abandoned.

This invention relates to a safety gate for a hoisting hook, and, more particularly, to a mechanism for releasably retaining the gate in a position such that the gate spans the throat of the hook so as to prevent inadvertent disengagement of the load from the hook.

Reference is made to U.S. Patent No. 2,791,817, which discloses a hoisting hook and safety gate that typify one form of commercially available structure. The cited patent discloses a hook from the body of which extends a cylindrical shank in combination with a gate member that includes a bored hub that fits on such hook shank and is rotatably moveable relative thereto. In the patented structure, the hub has a pin protruding therefrom and the hook body defines an opening into which the pin fits when the gate is in a position such that it spans the throat of the hook to close the hook. In addition, the patented structure discloses a spring within the hub that circumscribes the shank and rotatably biases the gate toward a position at which the gate closes the hook.

The structure disclosed in the referenced patent gives satisfactory service; the present invention constitutes a modification of the previously patented structure and contributes to improvements in fabrication and operation of the hook closure structure.

According to the present invention, there are provided complementary keystone shaped members on the gate and on the hook that engage one another when the gate is in a throat spanning position. The keystone shape is formed by members that have sloped or converging walls such that even a partial interengagement of the locking elements will cause efficient and secure closure of the hook by the gate member.

A feature and advantage of a structure of this type, wherein the locking elements are of keystone shape, is that the shape affords a flat surface of substantial area so that the unit force on such surfaces is sufficiently low during movement of the gate that wear on the rubbing parts is virtually eliminated.

Hooks of the type referred to above typically include on the shank thereof an eye to which is attached the end of a rope, safety belt, or like tension member. When the eye and the hook are in a loaded position in tension, the previously mentioned spring is not overstressed because it merely biases the locking gate to a closed position. If, however, the eye is moved toward the hook in compression, as is possible during normal use, the spring is exposed to shearing action by the eye. The present invention obviates this possibility by providing on the shank a portion of reduced diameter that defines an annular shoulder against which the eye bears so that even should a compressive load be applied on the eye and move the eye toward the hook body, the shoulder will prevent the eye from movement to a position at which shearing of the spring is possible.

It is often the case that hook gates are constructed of manganese-bronze alloy. Since such material possesses inherent lubricity, it is possible when the safety gate is subject to sufficient tangential force, or torque, for the keystone walls to slip, the hook unlocking inadvertently. Such unlocking creates undesirable hazards as the hook may unexpectedly open and the load fall free.

It is a further object of this invention, therefore, to provide a safety gate mechanism which will not unlock inadvertently. Accordingly, it has been found that by modifying the slope of the pressure side of the keystone protuberance, i.e, that side of the protuberance which faces opposite the direction of gate rotation to the open position, so that it lies in a plane generally radially of and parallel to the axis of rotation of the gate, slippage of the keystone is eliminated, and hence inadvertent unlocking prevented. The depressions provided in the latching gate for receiving the protuberances are further modified to engage and receive the modified keystone locking members.

Other objects, features and advantages of the present invention will be more apparent after referring to the following specification and accompanying drawings, in which:

FIG. 1 is an enlarged, fragmentary view of a gate locking structure according to the present invention, portions being broken away to reveal internal details;

FIG. 2 is a fragmentary, side view taken from line 2—2 of FIG. 1;

FIG. 3 is a side elevation view of a hoisting hook construction according to the present invention;

FIG. 4 is a top view of the hook and gate shown in FIG. 3; and

Figure 5:
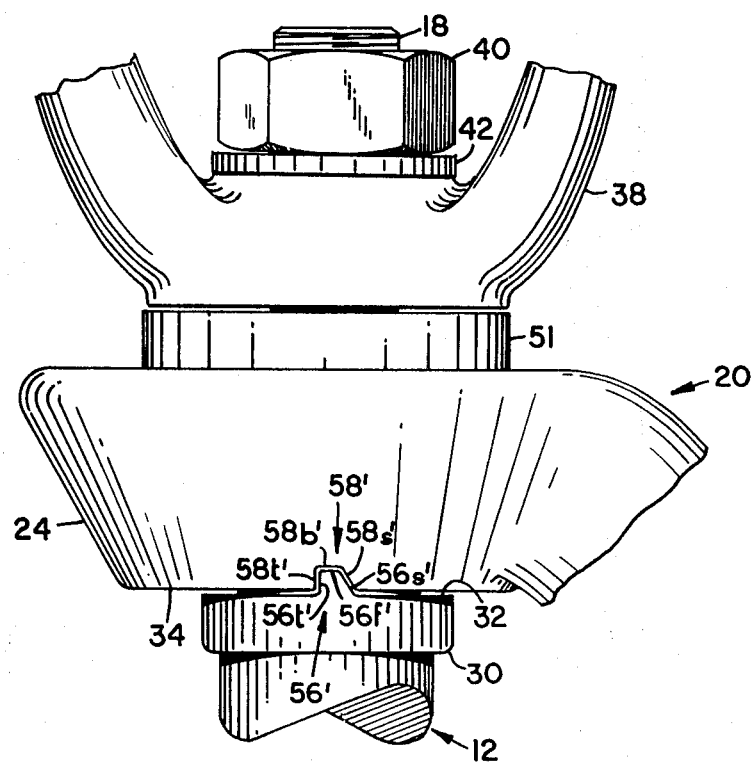
FIG. 5 is a view similar to FIG. 1 showing a modified locking structure according to the present invention.

Referring more particularly to the drawings, reference numeral 12 indicates a hoisting hook body that has a tip 14 at one extremity thereof thereby to define a throat 16 and a cylindric shank 18 at the opposite extremity thereof. Provided for movement into spanning relation of throat 16 is a gate 20 that includes a closure portion or throat-spanning portion 22 and a hub 24 that is bored at 26 so as to be rotatable on shank 18 to move the gate closure portion into and out of spanning relation to the hook throat. Shank 18 is formed with a cylindrical region 28 that has a diameter relative to that of bore 26 such that a snug rotative fit is afforded between the gate and hook.

The boundary between the main body of hook 12 and cylindric shank portion 28 is defined by a flange 30 that defines a bearing face 32 which is normal to the central axis of cylindric portion 28 of the hook shank. Gate hub 24 has a smooth surface 34 that confronts bearing face 32 and rests thereagainst when the gate is in a closed or throat-spanning position.

For effecting engagement of a load with hook 12, an eye 38 is fastened to shank 18 by means of a nut 40 threaded onto the outer end of the shank. A thrust washer 42 is installed between the nut and the eye to permit pivotal movement of eye 38 relative to hook shank 18. Eye 38 defines a closed loop, not shown in the drawing, to which is attached a rope, cable, safety belt, or like tension member. Cylindric portion 28 of shank 18 is of a diameter larger than the remainder of the shaft and the termination of the relatively large diameter portion defines an annular abutment 44. The abutment limits the movement of eye 38 in a direction toward the main body of hook 12.

Limitation of the movement of eye 38 in an axial direction with respect to hook shank 18 tends to protect a spring 46 that circumscribes the shank. At its upper end, spring 46 has a radially, inwardly extending tang 48 that engages a suitable hole in cylindric portion 28, and at its lower end, spring 46 has an axially extending tang 50 that engages a suitable hole in gate hub 24. Thus, it will be seen that spring 46 tends to bias the hub in rotative direction with respect to the hook. Spring 46 also biases hub 24 axially of the hook and toward bearing face 32 because an apertured disk or cup 51 supports the top end of the spring and rests against eye 38. Cup 51 includes integral therewith a cylindric flange 52 that extends into a counter bore 54 in gate hub 24 to exclude foreign matter and dirt from the moveable parts of the structure. Counter bore 54 is concentric with bore 26.

Cup 51 may be modified so that the bore in the cup is sized to fit over the reduced diameter portion of hook shank 18. To protect spring 46, the length of hook shank portion 28 is increased, i.e. the positioning of the abutment is raised to effect contact with eye 38.

As can be seen in FIG. 1, the axial extent of counter bore 54 is such that gate hub 24 can be moved axially of cylindric shank portion 28 in a direction toward eye 38. The amount of such movement is equal to or in excess of the axial dimension of a protuberance 56 that is integral with and projects from flange 30. Protuberance 56 has a flat surface 56f parallelly spaced from bearing face 32 by a distance that is the axial dimension of the protuberance. Protuberance 56 also includes side surfaces 56s that diverge outwardly from surface 56f to form a generally keystone-like shape.

Surface 34 of hub 24 defines a depression 58 that is complementary to protuberance 56. Depression 58 has a bottom wall 58b that corresponds to surface 56f and sidewalls 58s that correspond with side faces 56s. Although only one protuberance 56 and depression 58 have been described in detail, it can be seen from FIG. 2 that two protuberances and two depressions can be provided. In any event, the protuberances and depressions are positioned so that when they are in engagement with one another, closure portion 22 of gate 20 is in spanning relation to hook throat 16.

With reference to FIG. 5, a modified keystone locking member is illustrated wherein surface 34 of hub 24 defines a depression 58' that is complementary to protuberance 56'. Depression 58' has a bottom wall 58b' that corresponds to surface 56f', and side walls 58s' and 58t' that are complementary to and receive side walls 56s' and 56t'. Wall 56s' is sloped downwardly and outwardly from surface 56f'. Pressure surface 56t' extends downwardly from surface 56f' and lies in a plane that is parallel and generally radially of the axis of gate rotation to the open position.

Certain advantageous characteristics of the present invention can be most clearly understood by considering the operation of a hook and gate incorporating the invention. In order to engage the hook into a load, gate 20 is moved axially against spring 46 until hub surface 34 clears flat surface 56f on protuberance 56. At such position, gate 20 can be rotated to move closure portion 22 out of throat 16. The surfaces 56f, being of relatively large surface area, can be contacted by gate hub surface 34 during such rotation without causing significant wear or scoring either on the surface 34 or top flat surface 56f of the protuberance.

During such rotative movement it is not essential for the user to exert axially directed force on the gate because the large area of surface 56f obviates excessive wear on either the surface 56f or surface 34. When the load is engaged with the hook by passing the load through throat 16, it is usually sufficient to release a gate 20 since it will normally move into locking position because of the force stored in spring 46 during opening of the gate. Self-closure of the gate is expedited because of the relatively large flat surface area 56f over which the hub surface 34 moves during return movement. Because the mouth of depression 58 is broader than the surface 56f, protuberance 56 readily enters into the depressions. Once contact is established between a diverging surface 56s and a converging surface 58s, the force from spring 46 urges the protuberance and the depression into secure interlocking relationship. This in turn assures that closure member 22 is in spanning relation with throat 16.

It should be apparent that the above described characteristics of the present invention are likewise applicable to a hook in which the key has been modified as shown in FIG. 5. Surfaces 56f' and 56s' in the modified key are similar in structure to surfaces 56f and 56s, and have corresponding functions. Furthermore, nondiverging pressure surface 56t' will not slide upon surface 58t' when the hub is subject to tangential forces, thereby preventing disengagement of the safety hatch. When the gate is closed, protuberance 56' is in secure interlocking relationship with depression 58'.

Notwithstanding exercise of extreme care in using a hook made according to the present invention, it is inevitable that forces or impacts tending to move eye 38 toward the hook occur. Such circumstance was capable of causing structures made in conformity with the above mentioned U.S. Pat. No. 2,791,817 to shear a compression spring corresponding to spring 46 in the accompanying drawing. The present invention, however, provides annular abutment 44 in shank 18 which inhibits inward movement of the eye, and therefore prevents existence of a condition which would cause shearing of the spring. Maintenance of the integrity of the spring is an important advantage insofar as maintaining the safety afforded by the gate since the spring assists in moving the gate to the closed position and retaining the gate in such position.

The provision of a protuberance on flange 30 rather than on gate hub 24 expedites construction of the hook because the hook is large and massive and the formation of the protuberance 56 thereon adds little cost to production of the hook and adds little weight to the hook. More important, however, the protuberance, because it is positioned on a relatively massive hook, can be made larger; a larger protuberance 56 produces two beneficial results: (1) it permits enlargement of surface 56f which in turn reduces the wear on that surface and on surface 34 of hub 24 as the gate is rotated relative the hook shank, and (2) it makes the protuberance stronger and therefore provides a more secure positioning of the gate in throat-closing relationship. Formation of depressions 58 in gate hub 24 can be readily accomplished by milling or grinding a diametrically extending slot across surface 34.

Thus it will be seen that the present invention provides an improved gate latch that affords a more secure hook throat closure, is more expedient to construct, and is longer wearing and stronger than similar structures heretofore provided. Although one embodiment of the invention has been shown and described, it will be obvious that other adaptations and modifications can be made without departing from the true spirit and scope of the invention.

What is claimed is:

1. In combination with a hook that has a body, a tip spaced from the body so as to define a load supporting throat, and a cylindric shank extending from the body; and a gate having a hub board to afford pivotal movement on said shank and a closure member extending from the hub and adapted to span the throat of the hook, an improved structure for retaining the gate closure member in throat spanning relation comprising means integral with said hook for forming a bearing face for the gate hub at the boundary between said shank and said body, said bearing face being normal to said shank, a protuberance extending from the bearing face in a direction axially of the shank said protuberance having a flat surface parallelly spaced from said bearing face and side surfaces extending from said flat surface to said bearing face, at least one of said side surfaces diverging outwardly so that the dimension of the flat surface is less than the dimension of the protuberance at the bearing face, and a portion of said hub having a depression complementary to said protuberance, said hub depression having a bottom wall corresponding to the flat surface on said protuberance and side walls that correspond to the side surfaces of said protuberance so that when the protuberance is engaged in the depression relative rotation between the gate and the hook is precluded, said protuberance and depression being so positioned that the gate closure member spans the hook throat when the protuberance and depression are engaged with one another.

2. The invention of claim 1 wherein both side surfaces of said protuberance diverge outwardly.

3. The invention of claim 1 wherein said protuberance includes a nondiverging side surface extending downwardly in a place parallel to and radially of the axis of gate rotation to the open position, said hub depression having a bottom wall corresponding to the flat surface on said protuberance and side walls corresponding to said side walls of the protuberance, said nondiverging side wall preventing premature opening of the gate when subjected to tangentially directed forces.

4. The invention of claim 1 including a portion of said hub opposite from said depression being counterbored concentric with said bore to define a shoulder, a compression spring mounted in said counterbore and in circumscribing relation to said shank, said compression spring having a first end abutting said shoulder and a second end outward of said first end, and means connected to said shank for defining a surface in engagement with said second spring end for compressing the spring to bias the gate hub toward the bearing face.

5. The invention of claim 4 wherein said surface defining means comprises an apertured disk having a cylindric flange integral with and extending from said disk into said counterbore, the exterior shape of said flange sized to snugly fit into said counterbore to exclude foreign matter from the spring, the top of the disk engaged by a rigid eye being bored to fit over said hook shank, said eye having a surface concentric with the bore therein.

6. The invention of claim 5 wherein said hook shank has at the end thereof remote from the hook body a portion of reduced diameter that defines an abutment, the bore in said eye and disk being sized to fit into said reduced diameter portion and contact said abutment so as to prevent movement of said eye and disk past said abutment.

References Cited

UNITED STATES PATENTS 2,783,518   3/1957   Anderson _____ 24—241 PL
2,791,817   5/1957   Burnham _____ 24—241 PL DONALD A. GRIFFIN, Primary Examiner